United States Patent [19]

Downs et al.

[11] Patent Number: 4,713,436

[45] Date of Patent: Dec. 15, 1987

[54] GLYCOSIDE-CONTAINING POLYESTER PREPARATION PROCESS

[75] Inventors: John D. Downs; Raymond L. Drury, Jr.; Kenneth B. Moser; C. Deane Roth, all of Decatur, Ill.

[73] Assignee: A. E. Staley Manufacturing Company, Decatur, Ill.

[21] Appl. No.: 848,434

[22] Filed: Apr. 4, 1986

[51] Int. Cl.$^4$ .................... C08G 63/54; C08G 63/48
[52] U.S. Cl. .................. 528/295.3; 527/300; 527/311; 528/272; 528/295.5; 536/4.1; 536/115; 536/119
[58] Field of Search ............... 528/295.3, 295.5, 272; 536/4.1, 115, 119; 527/300, 311

[56] References Cited

U.S. PATENT DOCUMENTS 4,413,116 11/1983 Reuter et al. ............... 528/295.5 X Primary Examiner—Lucille M. Phynes
Attorney, Agent, or Firm—Michael F. Campbell; James B. Guffey; J. Daniel Wood

[57] ABSTRACT

Glycoside-containing polyester products having improved color characteristics are provided by a polyester preparation process in which a polyol reactant containing at least a minor proportion of a glycoside reactant is reacted with a lower alkyl ester of a polybasic acid. The color characteristics of such products are notably improved relative to that which is obtained when said reaction is instead conducted using the corresponding polybasic acid or anhydride in place of the indicated lower alkyl ester thereof.

The color improvement benefits of the present invention are particularly pronounced and dramatic when the polybasic acid component of the desired polyester product comprises an aromatic polybasic acid and when a lower alkyl ester of said aromatic polybasic acid is employed in the reaction in place of the aromatic acid itself.

16 Claims, No Drawings

GLYCOSIDE-CONTAINING POLYESTER PREPARATION PROCESS

BACKGROUND OF THE INVENTION

The present invention pertains to the preparation of polyester products in which at least a portion of the polyol reactant to be employed for such purpose is a glycoside material.

Polyester resins are a known class of polymeric compounds which are generally thought of or characterized as being the reaction product of polyhydric alcohols and polybasic acids. Such resins can vary widely in terms of their physical and chemical characteristics or properties depending upon the identity and nature of the specific polybasic acids and polyols chosen for their manufacture, the molecular weight of the final polyester product, and the like. Such resins find a wide range of practical uses such as in molded articles, paint and coating applications, adhesive applications, etc. See, for example, U.S. Pat. No. 4,115,473 to Downs (issued Sept. 19, 1978) wherein a thermosetting metal coating composition is provided by initially preparing a polyol intermediate by reacting neopentyl glycol in a 2:1 molar ratio with dimethyl glutarate; polymerizing such intermediate with a phthalic acid reactant and neopentyl glycol to form a polyester resin; and admixing said polyester resin with an aminoplast and an aromatic hydrocarbon solvent to form the indicated thermosetting metal coating composition.

Alkyd resins are a particular type of polyester resin, namely polyester resins which have been modified with monobasic fatty acids, which find widespread and beneficial use in protective coating applications such as, for example, in industrial coatings, paints and the like. See for example U.S. Pat. No. 4,181,638 to Lasher (issued Jan. 1, 1980) which discloses a crosslinkable, high solids polyester resin-based coating composition. Said composition comprises a low molecular weight polyester resin and an aminoplast resin which provides cross-linking upon cure. According to this patent, the low molecular weight polyester resin component is preferably prepared by reacting a cyclic dicarboxylic acid or anhydride with a mixture of mono- and di-fatty esters of triols such as glycerol, trimethylol propane and the like. In preparing said polyester resins, the reactants are charged to a heated reactor vessel along with a reflux solvent such as n-heptane, xylene or toluene and an acid catalyst such as phosphoric acid or sulfuric acid; the reaction mixture is blanketed with an inert gaseous atmosphere (e.g., carbon dioxide); and the reaction is conducted at a temperature below about 150° C. until the reaction is about 90 percent complete, after which the reaction is completed at a temperature of from 175° to about 190° C.

Another category of polyester products is conveniently characterized as reactive diluent materials. These are typically very low molecular weight (e.g., oligomeric) liquid polymeric polyester materials which find beneficial use in industrial baking enamels. In such use, these materials are employed in place of non-reactive organic solvents to reduce the viscosity of the baking enamel compositions. Since such materials are, by virtue of their hydroxyl and/or carboxyl end groups, reactive in character, they are incorporated into the cured baking enamel composition itself and thereby reduce or eliminate the volatile organic solvent emissions which are normally associated with oven curing of non-reactive organic solvent-containing baking enamel compositions.

Any number of polybasic acids and polyhydric alcohols can theoretically be employed to prepare the aforementioned polyester products. However, as a practical matter, phthalic anhydride is one of the more commonly used polybasic acids, particularly for alkyd resin applications, and glycerol and pentaerythritol are quite commonly used as the polyhydric alcohol component. Frequently, mixtures of pentaerythritol with glycerol or with ethylene glycol are used to effectively reduce the pentaerythritol functionality and to thereby conrol the degree of crosslinking in the resulting pentaerythritol-based polyester resin product. In alkyd resin systems, mixtures of phthalic anhydride with a minor proportion (e.g., from 1 to 10 weight percent based on phthalic anhydride weight) of maleic or fumaric acid are sometimes employed to achieve improved color, processing time, and water resistance in phthalic anhydride-based alkyd resin products.

As is noted briefly above, it is common practice to employ selected mixtures of polybasic acids and/or selected mixtures of polyhydric alcohols to control the ultimate physical and chemical characteristics of the polyester product to be produced. For example, one of the various polyhydric co-polyols which has been suggested for use in alkyd resin manufacture is methyl glucoside. For example, in an article by J. P. Gibbons entitled "Methyl Glucoside," *Paint and Varnish Production*, Vol. 48, No. 11, October 1958 (pages 57–63) there is discussed the preparation of methyl glucoside-containing oil-modified alkyd resins by alcoholysis of triglycerides with methyl glucoside followed by reaction of the resulting alcoholysis product with dibasic acid materials such as tetrahydrophthalic or maleic anhydrides, or fumaric, succinic, adipic, sebacic or azelaic acids. In said article, it is noted that when methyl glucoside-containing oil-modified alkyd resins of the sort described above are prepared using phthalic anhydride as the dibasic acid component very dark-colored alkyd resin products are produced.

Since glycosides such as methyl glucoside represent economically attractive polyol components for potential use in the manufacture of polyester products, it would be highly desirable to provide a process by which glycoside-containing polyester products having improved color characteristics could be satisfactorily manufactured. The use of glycosides as polyol components in the preparation of polyester products is also desirable from the standpoint that the cyclic character thereof can serve to impart enhanced rigidity and hardness to the resulting polyester products. Additionally, since aromatic dibasic acids or anhydrides such as phthalic anhydride are commonly used dibasic acid components in polyester resin manufacture, it would be extremely desirable to provide a process by which glycoside-containing, aromatic dibasic acid or anhydride-based polyester products having commercially acceptable color characteristics could be satisfactorily produced.

SUMMARY OF THE INVENTION

It has now been discovered that improved color characteristics are imparted to glycoside-containing polyester products when a lower alkyl ester of a polybasic acid is employed in place of the polybasic acid itself (or in place of the anhydride of such polybasic acid) in the reaction process employed for preparing such polyester product. Accordingly, the present invention, in one of its key aspects, is a process for preparing a polyester product, said process comprising the reaction, at an elevated temperature, of a lower alkyl ester of a polybasic acid with a polyol reactant containing at least a minor proportion of a glycoside reactant.

The indicated process is broadly applicable to polymeric (or oligomeric) polyester products in general including, for example, those generally referred to in the art as "oil-free polyester resins", "alkyd resins" and "reactive diluents".

The improved color benefits of the present invention are particularly pronounced and beneficial for those polyester products wherein at least a portion of the polybasic acid component to be interpolymerized therein is aromatic in character and wherein a lower alkyl ester of said aromatic polybasic acid component is employed in the reaction in place of at least a portion of the aromatic polybasic acid component itself.

As used herein, the terms "polybasic acid" and "polybasic acid component" are to be understood as connoting both the polybasic acid itself and the anhydride thereof.

The term "lower alkyl ester of a polybasic acid" as used herein encompasses both partial lower alkyl esters of polybasic acids (i.e., wherein less than all of the carboxyl groups of the polybasic acid have been esterfied with a lower alcohol) and complete esters thereof wherein all the carboxyl groups of such acid component have been esterified with a lower alcohol.

Especially preferred embodiments of the present invention are those wherein the lower alkyl ester component is a complete lower alkyl ester of a polybasic acid.

For the purpose of brevity, the "lower alkyl ester of a polybasic acid" will at times be referred to herein as the "ester reactant" or as a 37 polybasic ester reactant".

DETAILED DESCRIPTION OF THE INVENTION

The polyol reactant component employed in the practice of the present invention contains at least a minor proportion of a glycoside material such as, for example, an alkyl, alkenyl or aryl glycoside material. Typically, such glycoside materials will correspond to the formula:

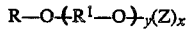

$$R-O(R^1-O)_y(Z)_x \qquad A$$

wherein R is an alkyl, alkenyl or aryl group (generally containing from 1 to about 30, preferably from 1 to about 18 and most preferably from 1 to about 6, carbon atoms); O represents an oxygen atom; $R^1$ is a $C_2$-$C_4$ divalent hydrocarbon radical such as ethylene, propylene or butylene [most preferably the unit $(R^1-O)_y$ represents repeating units of ethylene oxide, propylene oxide and/or random or block combinations thereof]; y is a number having an average value of from 0 to about 12 (preferably y is zero); Z represents a moiety derived from a reducing saccharide containing 5 or 6 carbon atoms (most preferably a glucose unit) to which the moiety $R-O(R^1-O)_y$ is attached in the number 1 saccharide position; and x represents the degree of polymerization (D.P.) of said glycoside material and typically is a number having an average value of from 1 to about 10 (preferably from 1 to about 5, more preferably from 1 to about 3, and most preferably from 1 to about 1.5). Lower alkyl monoglycosides (especially methyl glucoside) and derivatives thereof are of particular interest for use in the practice of the present invention.

The glycoside materials of the Formula A above can suitably be in the form of the glycoside per se (e.g., wherein the saccharide hydroxyls on the moiety Z in other than the number 1 position are "free" or unsubstituted) or, if desired, one or more of said saccharide hydroxyls can have been derivatized so long as, on average, at least about 2 free hydroxyls are available or remain per glycoside molecule, thereby permitting the resulting glycoside derivative to still function as a true "polyol" within the polyester manufacturing operation of interest.

Examples of suitable glycoside derivatives for use herein include partial (e.g., mono- and di-) glycoside esters; partial (e.g., mono- and di-) glycoside ethers; acetal and ketal derivatives of said glycoside compounds and the like. Said derivatives may comprise lower alkyl or alkenyl esters, ethers, etc.; higher alkyl or alkenyl esters, ethers, etc.; aromatic ethers, esters etc.; and the like.

Additional glycoside derivatives suitable for use herein also include those of the Formula A above in which one or more of the normally free (i.e., unreacted) hydroxyl groups of the saccharide moiety, Z, have been alkoxylated (preferably, ethoxylated or propoxylated) so as to attach one or more pendant alkoxy or poly (alkoxy) groups in place thereof. In such event, the amount of alkylene oxide (e.g., ethylene oxide, propylene oxide, etc.) employed will typically range from about 1 to about 20 (preferably from about 3 to about 10) moles thereof per mole of saccharide moiety within the Formula A glycoside material.

In glycosides of the Formula A above, the $RO(R^1O)_y$ group is generally bonded or attached to the number 1 carbon atom of the saccharide moiety, Z. Accordingly, the free hydroxyls available for alkoxylation are typically those in the number 2, 3, 4 and 6 positions in 6-carbon atoms saccharides and those in the number 2, 3 and 4 positions in 5-carbon atom saccharide species. Typically, the number 2 position hydroxyls in 5-carbon saccharides, and the number 2 and 6 position hydroxyls in 6-carbon saccharides, are substantially more reactive or susceptible to alkoxylation than those in the number 3 and 4 positions. Accordingly, alkoxylation will usually occur in the former locations in preference to the latter. Examples of the indicated alkoxylated glycoside materials, and of methodology suitable for the preparation of same, are described in U.S. patent application Ser. No. 704,828 filed Feb. 22, 1985 by Roth et al, now abandoned, published as International Publication No. WO 86/04899 on Aug. 28, 1986, and is incorporated herein by reference.

Partial (e.g., mono- and di-) fatty acid esters and partial (e.g., mono- and di-) fatty ethers of the above-described alkoxylated glycoside materials may also be suitably employed as the glycoside reactant within the practice of the present invention.

The terms "glycoside reactant" and "glycoside material" as used herein are to be understood as encompassing both the glycoside compound per se as well as any and all of the aforementioned glycoside derivatives.

In one embodiment of the present invention, the polyester resin produced thereby is an alkyd resin material and, in said embodiment, the characteristic drying oil (e.g., unsaturated fatty acid) modification thereof can be conveniently imparted thereto via the use, as at least a portion of the glycoside component, of a glycoside derivative in which at least one hydroxyl group (but less than all so as to leave an average of at least about 2 free hydroxyls per glycoside molecule) of the saccharide moiety, Z, has been esterified or etherified so as to attach an unsaturated fatty group thereto via an ester or ether linkage. Such fatty acid ester glycoside derivatives can be suitably prepared via a direct esterification reaction between the starting glycoside compound and an unsaturated fatty acid; via an exchange reaction between said glycoside compound and a lower alkyl ester of an unsaturated fatty acid; or via an alcoholysis reaction between said glycoside compound and triglyceride oils such as soybean oil, linseed oil, palm kernel oil, sunflower oil, canola oil, coconut oil, tung oil, and the like. On the other hand, the indicated fatty ether derivatives can be suitably prepared via the reaction of the starting glycoside compound with an unsaturated fatty halide material or other suitable higher alkenyl etherifying reagents.

In another embodiment of the present invention which is of particular interest, an alkyd resin is prepared in a single step reaction in which the polyol component, the lower alkyl ester of a polybasic acid (preferably the complete lower alkyl ester thereof) and a lower alkyl ester of a fatty acid are all charged to a reaction vessel and are simultaneously reacted (at an elevated temperature with removal of at least a substantial portion of the lower alcohol liberated during he reaction) to prepare the desired alkyd resin product.

While the aforementioned glycoside material can constitute the sole polyol reactant in the present process, it will more commonly be employed as a portion of a polyol mixture containing one or more other polyol components such as, for example, ethylene glycol, glycerol, pentaerythritol, mixtures of mono-, di- and triglycerides and the like. Advantageously, said glycoside material will constitute from about 10 to 100 (preferably from about 15 to about 50 and more preferably from 15 to about 30) weight percent of said polyol mixture.

In preparing the aforementioned polyol mixture, a number of suitable alternatives are applicable. Thus, for example, the glycoside reactant of interest can simply be admixed in the chosen proportion with any other desired polyol components (e.g., ethylene glycol, glycerol, pentaerythritol, admixed mono-, di- and triglycerides, and the like) prior to said esterification reaction. On the other hand, when the polyol mixture of interest is to contain mono- and/or diglycerides, the glycoside reactant can be employed in an alcoholysis reaction in which said glycoside reactant (either with or without other polyols such as ethylene glycol, glycerol, pentaerythritol, etc.) are transesterified with a triglyceride oil to thereby form a polyol mixture comprising mono- and diglycerides, mono-, di-, tri- and tetra-fatty acid/glycoside esters and the like. Alternatively still, such an alcoholysis reaction can be separately conducted as between a non-glycoside polyol such as ethylene glycol, glycerol, pentaerythritol etc. and the aforementioned triglyceride oil and the resulting alcoholysis product can thereafter be admixed with the glycoside reactant prior to conducting the polyesterification reaction of interest herein.

Suitable non-glycoside polyol components for use as a copolyol ingredient either in the polyesterification reaction itself or in a preliminary alcoholysis reaction (if any) or in both types of reactions include ethylene glycol, 1,3-butanediol, 1,4-butanediol, cyclohexanedimethanol, diethylene glycol, dimethylol propionic acid, dipropylene glycol, 1,6-hexanediol, hexylene glycol, neopentyl glycol, 1,5-pentanediol, propylene glycol, tetraethylene glycol, triethylene glycol, trimethylene glycol, trimethyl pentanediol, glycerol, trimethylol ethane, trimethylol propane, pentaerythritol, and the like.

In one embodiment of particular interest herein, the polyester resin to be prepared is an alkyd resin and the glycoside-containing polyol component employed in the esterification reaction to produce same further comprises a glyceride mixture predominantly composed of mono- and di-glycerides in which at least about 35 weight percent of said glyceride mixture is composed of monoglyceride material. In said embodiment, the indicated polyol mixture is preferably prepared by an alcoholysis process in which a triglyceride oil (preferably soybean oil, coconut oil or linseed oil) is transesterified with a starting glycoside reactant of the Formula A above in which the saccharide hydroxyls of the moiety Z are in free or unreacted form prior to said alcoholysis reaction.

Typically, said alcoholysis reaction is conducted at a temperature of from about 200° to about 270° C. (preferably from about 235° to about 250° C.) and in the presence of a transesterification catalyst such as lithium carbonate, lithium hydroxide, potassium hydroxide, lithium ricinoleate, dibutyltin oxide or titanate esters until equilibrium is reached. The molar ratio of triglyceride oil to glycoside reactant in said alcoholysis reaction is typically in the range of from about 1.0:0.5 to about 1.0:2.25 (preferably from about 1.0:1.1 to about 1.0:1.3) and said reaction is preferably conducted in a fashion such that the resulting reaction product contains less than 1% glycerol. It is also generally preferred that the residual free or unreacted glycoside content remaining following the alcoholysis reaction be less than about 8 (more preferably less than about 5 and most preferably less than about 3) weight percent on a total alcoholysis product weight basis. Typically, the triglyceride oil employed in said alcoholysis reaction will be of the type predominantly containing unsaturated fatty acid groups of from about 6 to about 24 (preferably from about 8 to about 20) carbon atoms.

With regard to the aforementioned alcoholysis reaction, it has been observed that undesirably high color levels can develop within the resulting alcoholysis product and that same can carry through and impart or contribute undesirable or unacceptable color characteristics to the ultimate alkyd resin product of interest. Thus, in order to facilitate obtention of acceptable color characteristics in the final alkyd resin product of concern, it has been found to be important to conduct said alcoholysis process in a fashion such that color development or generation is minimized (or at least kept to acceptably low levels) during the course of said alcoholysis reaction. Typically, if the alcoholysis product has a Gardner color (as measured while still hot following the alcoholysis reaction) of from about 2 to about 9 (preferably about 2 to about 5), then it will be suitable for use in the preparation of acceptable color alkyd resins in accordance with the present invention.

In connection with the foregoing, one approach for obtaining acceptable color alcoholysis product is to conduct the alcoholysis reaction by heating the triglyceride oil and transesterification catalyst (e.g., lithium or sodium compounds) under an inert atmosphere to about 270° C.; then adding the glycoside starting material (i.e., of the Formula Z above having its saccharide hydroxyls in free or unreacted form) gradually or incrementally (e.g., in 3 or 4 spaced incremental additions) over a 30 minute period, being careful not to permit the reaction temperature to fall below about 260° C. during said glycoside additions; and thereafter continuing said reaction for about 1 to 1½ hours at about 260° C. See in this regard the methyl glucoside alcoholysis procedure which is described in U.S. Pat. No. 3,321,419 (issued May 23, 1967 to Harry M. Kennedy) and in "Methyl Glucoside" by J. P. Gibbons, *Paint and Varnish Production*, Vol. 48, No. 11, October, 1958 (pages 57–63) and which is incorporated herein by reference.

Another approach which has been found to be suitable for obtaining acceptable color alcoholysis product for use herein involves initially admixing the triglyceride oil, an effective amount (e.g., on the order of about 0.4 to 0.6 weight percent based upon the weight of the triglyceride oil only) of the transesterification catalyst (e.g., lithium hydroxide monohydrate) and the glycoside reactant together at ambient temperature along with from about 0.5 to about 10 weight percent (preferably about 2 weight percent) water on a total reaction mixture weight basis; thereafter raising the temperature of said mixture to a reaction temperature of from about 230°–250° C., during which time water vapor is removed from the reaction mixture; and conducting the reaction at said temperature (typically with moderate to vigorous agitation) for a period of approximately an hour or so. Upon completion of said reaction, the resulting hot alcoholysis product should be capable of dissolving at least about 3 parts by volume methanol in one part by volume of said alcoholysis product without exhibiting a visibly detectable cloud point, thereby evidencing essentially complete conversion of the triglyceride starting material to mono- and diglyceride reaction products.

The inclusion of water in the reaction mixture as indicated above substantially reduces the propensity for undesirably or unacceptably high color levels to develop in the alcoholysis product during the preparation thereof. Further, the inclusion of water in the indicated glycoside/triglyceride oil alcoholysis reaction substantially increases the degree of conversion of the glycoside reactant to the desired glycoside ester alcoholysis product and thereby substantially reduces (e.g., by a factor of as much as 2 or 3) the amount of residual, unreacted glycoside material within the resulting alcoholysis product. Additionally, it is also beneficial and preferable in said reaction to conduct same under neutral or alkaline conditions. Further, it is also preferred to employ a non-glycoside copolyol material such as, for example, glycerol, pentaerythritol, ethylene glycol and the like in conjunction with the glycoside starting material in the foregoing alcoholysis reaction. Advantageously, said copolyol material will normally be employed in an amount ranging from about 10 to about 90 (especially about 30 to 70) weight percent of the total polyol reactant weight. Typically, the inclusion of such a non-glycoside copolyol material (in conjunction with the inclusion of water as hereinbefore described) provides even further improvement in the color characteristics of the resulting alcoholysis product.

As yet another way of preparing glycoside-containing alkyd resins in accordance with the present invention, it should be noted that direct (or one stage) esterification techniques may also be satisfactorily employed. Thus, in accordance with this particular alternative, a glycoside reactant of the Formula A above whose saccharide hydroxyls are in free or unsubstituted form is directly admixed (either with or without a non-glycoside copolyol, as desired) with the desired proportion of a fatty acid or, preferably, a lower alkyl ester of a fatty acid and with a lower alkyl ester of the desired polybasic acid and are directly esterified at an elevated temperature while removing lower alcohol by-product (or mixtures thereof with water) to form the alkyd resin product of interest.

In the practice of the present invention, at least a portion of the polybasic acid or anhydride component which would conventionally be employed in the preparation of the various polymeric or oligomeric polyester products which are of interest herein is replaced in the polyesterification process with a lower alkyl ester (most preferably a complete lower alkyl ester) of a polybasic acid. Preferably, the polybasic ester reactant component will constitute from about 20 to about 100 (more preferably from about 50 to about 100) mole percent of the combined total amount of itself and any free polybasic acid or anhydride component to be used in the reaction process of interest.

As used herein, the term "complete lower alkyl ester of a polybasic acid" refers to a carboxylic acid or anhydride compound bearing at least two carboxyl groups (in either free acid, salt or anhydride form) on the molecule and which has been reacted with a lower alkanol to convert each of the carboxyl groups on said molecule to its corresponding lower alkanol ester.

As used herein, the term "lower alkyl" and the term "lower alkanol" connote, respectively, alkyl groups and alkanols containing from 1 to about 6 carbon atoms. Preferred lower alkyl ester materials for use herein are the $C_{1-3}$ alkanol esters and especially the methyl and/or ethyl esters.

Polybasic acid or anhydride reactants which are conventionally employed in processes for the preparation of polymeric or oligomeric polyester products and which, in accordance with the present invention, are at least partially replaced in such preparation processes with lower alkanol/polybasic acid ester reactants, include both aromatic polybasic acids or anhydrides and aliphatic polybasic acids or anhydrides. Representative examples of suitable aromatic polybasic acids or anhydrides include orthopathalic acid, orthophthalic anhydride, isophthalic acid, terephthalic acid, trimellitic anhydride, and the like. Of these, phthalic anhydride is one of the more commonly utilized aromatic dibasic acid materials employed in conventional polyester or alkyd resin manufacturing operations.

Representative examples of suitable aliphatic polybasic acids or anhydrides include both saturated and unsaturated aliphatic polybasic acids or anhydrides and thus include malic acid, tartaric acid, glutaric acid, adipic acid, succinic acid, succinic anhydride, sebacic acid, azelaic acid, citric acid, cyclohexane dicarboxylic acid, etc. as well as maleic acid, maleic anhydride, fumaric acid, citraconic acid, itaconic acid, tetrahydrophthalic anhydride, aconitic acid, and the like. Of the foregoing aliphatic dibasic acids and anhydrides, adipic acid, maleic acid, maleic anhydride, glutaric acid, succinic acid, fumaric acid and tetrahydrophthalic anhydride are generally preferred.

Representative examples of suitable partial lower alkyl esters of polybasic acids for use herein include monomethyl orthophthlate, monoethyl orthophthalate, monopropyl orthophthalate, etc.; monomethyl isophthalate, monoethyl isophthalate, monopropyl isophthalate, monobutyl isophthalate, etc.; mono-lower alkyl (e.g. methyl, ethyl, propyl butyl, etc.) esters of terephthalic acid; mono-lower alkyl esters of malonic acid; mono-lower alkyl esters of succinic acid; mono-lower alkyl esters of glutaric, adipic, azelaic, sebacic or cyclohexane dicarboxylic acid; mono- or di-lower alkyl esters of trimellitic anhydride; and the like.

Representative examples of suitable complete lower alkyl esters of polybasic acid for use herein include dimethyl ortho phthalate, dimethyl isophthalate, dimethyl terephthalate, dimethyl malonate, dimethyl succinate, dimethyl glutarate, dimethyl adipate, dimethyl azelate, dimethyl sebacate, trimethyl mellitate, dimethyl cyclohexane dicarboxylate etc. as well as the corresponding complete ethyl, propyl, butyl, pentyl etc. esters of the indicated polybasic acid materials.

As has been noted above, the color improvement benefits provided by the present invention are most pronounced when at least a portion of the polybasic acid or anhydride component to be incorporated into the glycoside-containing polyester product of concern is aromatic in character. Accordingly, an especially preferred embodiment of the subject invention is a polyester preparation process wherein at least a portion of the polybasic acid or anhydride component to be employed is an aromatic acid or anhydride and wherein at least a portion (most preferably substantially all) of said aromatic acid or anhydride is replaced within such process with a lower alkyl ester (preferably a complete lower alkyl ester) of an aromatic polybasic acid.

The reaction parameters and conditions employed in conducting the glycoside-containing polyester preparation process of the present invention generally correspond to those typically employed in the art for preparing various polymeric and oligomeric polyester products. Thus, for example, the process of the present invention is typically conducted at an elevated temperature in the range of from about 120 to about 240 (preferably from about 190 to about 215)°C. while removing at least a substantial portion of the lower alkanol (or a mixture of lower alkanol and water) which is liberated or generated during the course of polyesterification reaction. Such process is preferably conducted under an inert gaseous atmosphere (e.g., nitrogen, carbon dioxide, etc.) and may be conducted at atmospheric pressure, sub-atmospheric pressure or super-atmospheric pressure, as desired. Preferably, however, the reaction is usually conducted at atmospheric pressure.

An alcoholysis (or transesterification) catalyst such as, for example lithium carbonate, lithium hydroxide, potassium hydroxide, lithium ricinoleate, dibutyl tin oxide, etc. may optionally be (and preferably is) employed within the indicated process in an amount corresponding to about 0.05 to about 0.5 weight percent on a total weight basis.

The ratio of polyol reactant to polybasic ester reactant (or combined polybasic ester reactant and polybasic acid or anhydride reactant) employed in the reaction process will predominantly depend upon the nature of (or more specifically the molecular weight desired for) the polyester product to be produced thereby. Thus, for example, in the case of relatively low molecular weight (e.g., oligomeric) polyester products such as those intended for use as reactive diluents and/or as polyol reactants in rigid or flexible polyurethanes or elastomers, the ratio of polyol reactant to ester reactant (or combined polybasic acid or anhydride and ester reactants) will typically be sufficiently high so as to provide from about 40 to about 100 percent (preferably from 50 to about 70 percent) excess hydroxyl equivalent weight relative to the carboxyl equivalent weight provided by the polybasic acid or anhydride and/or ester reactant.

On the other hand, in the case of relatively higher molecular weight polymeric polyester products such as alkyd or polyester resins, the ratio of polyol reactant to polybasic acid or anhydride reactant and/or ester reactant will typically be sufficient to provide from about 20 to about 50 (preferably from about 20 to about 40) percent excess hydroxyl equivalent weight relative to the carboxyl equivalent weight provided by said acid (or anhydride) and/or ester reactant.

The progress and/or completion of the subject reaction process can be conveniently monitored in terms of the cumulative amount of lower alkanol (or lower alkanol and water) generated during the course of the reaction relative to the total theoretical amount of same which would be generated upon complete conversion or rection of the limiting reaction component. As a general rule, the reaction is considered to be sufficiently complete for most practical purposes when the amount of lower alkanol (or lower alkanol and water) generated reaches at least about 80 (preferably at least about 90) percent of its theoretical completion level.

Following their preparation in the above-described fashion, the resulting glycoside-containing polyester products are suitably employed in the usual manner in the various known polyester product end uses such as, for example, in molded articles, in paint and coating applications, as reactive dilutents, in adhesive applications, and the like.

As has been noted briefly above, relatively low to moderate molecular weight (i.e., oligomeric) polyester products hereof are suitable for use as reactive diluents in various coatings applications and/or as polyol reactants in the preparation of polyurethane products such as rigid or flexible urethane foams, urethane elastomers and the like. On the other hand, the relatively high molecular weight products hereof are suitably used in polyester resin and alkyd resin end-use applications.

As used herein, the term "low molecular weight" is to be understood as connoting a number averae molecular weight in the range of from about 400 to about 1200; the term "moderate molecular weight" is to be understood as connoting a number average molecular weight in the range of from 1200 to about 15,000; "high molecular weight" connotes number average molecular weights of about 15,000 and above; and "oligomer" or "oligomeric" is to be understood as encompassing both low and moderate molecular weight products.

The present invention is further illustrated by reference to the following examples thereof in which, unless otherwise specified, all parts and percentages are on a weight basis and all temperatures are stated in °C.

EXAMPLES 1–3

In these examples, a series of methyl glucoside-containing oil-free polyester resins (the recipes for which are summarized in Table A below) are prepared by reacting a mixture of dimethyl terephthalate and adipic acid with a polyol mixture containing neopentyl glycol and methyl glucoside. Such reactions are carried out by charging the polyol mixture and the adipic acid and dimethyl terephthalate reactants to a reactor vessel equipped with a packed column condenser and a receiver vessel; heating the reaction mixture to 100° C. under a nitrogen blanket; then adding the dibutyl tin oxide catalyst; and continuing to heat the mixture to 170° C. During the reaction methanol and water evolves from the reaction mixture and is collected in the receiver vessel and the reaction temperature is allowed to rise slowly over a six (6) hour period to 215°-220° C. while continuing to remove methanol and water from the mixture. Following the indicated reaction period, the reaction is essentially complete and the reaction mixture is reduced to 80% non-volatiles with propylene glycol monomethyl ether acetate.

For comparative purposes, an experiment is also conducted (Control #1) wherein phthalic anhydride is used in place of the dimethyl terephthalate component. Additional comparative experiments (Controls #2 and #3) are conducted in which the methyl glucoside reactant is replaced with trimethylol propane in both phthalic anhydride-containing (Control #2) and dimethyl terephthalate-containing (Control #3) formulations.

Color, viscosity and non-volatiles content characteristics for the resulting polyester products are included in Table A below.

comparable formulations not containing methyl glucoside, regardless of whether the formulation contains an aromatic polybasic acid or anhydride ingredient or not.

Comparison of Example 1 with Example 2 illustrates that substitution of dimethyl terephthalate for a portion of Example 1's adipic acid component significantly improves the color of the resulting polyester product.

EXAMPLES 4-7

In these examples, a series of relatively low molecular weight methyl glucoside-containing oil-free polyester products are prepared and evaluated as to their suitability for use as relatively non-volatile reactive diluents in coating applications such as, for example, in industrial baking enamels.

The reaction procedure and conditions employed in preparing these products generally corresponds to that described in Examples 1-3 above and the ingredient recipes used are summarized in Table B below.

TABLE B

|  | Example #4 | | Example #5 | | Example #6 | | Example #7 | |
| --- | --- | --- | --- | --- | --- | --- | --- | --- |
|  | Wt % | Moles | Wt % | Moles | Wt % | Moles | Wt % | Moles |
| INGREDIENTS | | | | | | | | |
| Ethylene Glycol | 27.33 | 3.5 | 27.40 | 4.0 | 30.06 | 4.0 | — | — |
| Neopentyl Glycol | — | — | — | — | — | — | — | 3.0 |
| Methyl Glucoside | 12.22 | 0.5 | 10.72 | 0.5 | 11.76 | 0.5 | — | 1.0 |
| Dimethyl Glutarate | 60.45 | 3.0 | 61.88 | 3.5 | 58.18 | 3.0 | — | 3.0 |
| PARAMETERS & RESULTS | | | | | | | | |
| Theor. Mol. Wt. | 602 | | 681 | | 422 | | — | |
| OH Groups/Mole | 3 | | 3 | | 2.67 | | — | |
| OH Equiv. Wt. | 201 | | 227 | | 158 | | — | |
| Theor. OH No. | 279 | | 247 | | 355 | | — | |
| Actual OH No. | 290 | | 232 | | — | | — | |
| Color | 2+ | | 2 | | 2 | | 3 | |
| Visc. 100% N.V. | $Z_2$ | | $Z_1$-$Z_2$ | | Y | | — | |
| 80% N.V. | L-M | | K | | G-H | | — | |

The resulting oligomeric polyester products are evaluated by reducing to 80 weight percent non-volatiles

TABLE A

|  | EXAMPLES | | | COMPARATIVE CONTROLS | | |
| --- | --- | --- | --- | --- | --- | --- |
|  | #1 | #2 | #3 | #1 | #2 | #3 |
| INGREDIENTS[1] | | | | | | |
| Neopentyl glycol | 2.25 | 2.25 | 2.15 | 2.26 | 2.26 | 2.25 |
| Methyl glucoside | 0.40 | 0.40 | 0.30 | 0.37 | — | — |
| Trimethylol propane | — | — | — | — | 0.37 | 0.40 |
| Dimethyl terephthalate | 1.00 | 1.40 | 1.00 | — | — | 1.00 |
| Adipic acid | 1.00 | 0.60 | 1.00 | 1.00 | 1.00 | 1.00 |
| Phthalic anhydride | — | — | — | 1.00 | 1.00 | — |
| PARAMETERS & RESULTS | | | | | | |
| Excess hydroxyl (%) | 32 | 32 | 22.5 | 31.5 | 31.5 | 32 |
| Theoretical hydroxyl no. | 142 | 140 | — | 158 | 151 | 143 |
| Actual hydroxyl no. | 162 | — | — | — | 134 | 135 |
| Methanol off (% Theoretical) | 77 | 71 | 72 | — | — | 100 |
| Water off (% Theoretical) | 99 | 100 | 93 | — | 99.3 | 76 |
| Total distillate (% Theoretical) | 80 | 80.2 | 80 | — | 99.3 | 80 |
| Non-volatile | 80.0 | 80.2 | 80.0 | 80 | 80.6 | 80.0 |
| Viscosity | $Z_3$ | $Z_4$ | Z-$Z_1$ | $Z_1$ | Z- | $Z_4$+ |
| Color[2] | 8-9 | 3 | 5 | 12 | <1 | <1 |

[1]Ingredient amounts stated in equivalents.
[2]High color numbers indicate highly colored or dark products and are undesirable.

Comparison of the color value for Control #1 with those of Examples 1-3 illustrates the severity of the color problem associated with aromatic polybasic acid or anhydride-based methyl glucoside-containing polyester resin products and also illustrates the color improvement benefits provided by the practice of the present invention.

The color values for Controls 2 and 3 illustrate that color development problems are not encountered with with propylene glycol monomethyl ether acetate and determining the weight loss of the resulting solutions at 105° C. and 121° C. for periods of one to five hours. Weight loss results are found to be in the range of from 3 to 6.7 weight percent (polyester product weight basis) and are considered to be generally acceptable for reactive diluent end-use purposes.

The oligomeric polyester products are also evaluated by blending with a stoichiometrically equivalent amount of hexamethoxymethylmelamine (effective functionality of 2.44 equivalent/mole); reducing the resulting blend to 80 weight percent non-volatiles with propylene glycol monomethyl ether acetate; adding an acid catalyst (i.e., para-toluene sulfonic acid); and curing the resulting mixture at two different elevated temperatures, specifically at 250° F. (121° C.) and 325° F. (163° C.), for a time period of from ½ to 2 hours.

The weight loss results obtained are within the range generally considered to be acceptable for reactive diluent/baking enamel end-use applications.

While the present invention has been described and illustrated by reference to particular embodiments and examples thereof, such is not to be interpreted as in any way limiting the scope of the presently claimed invention.

What is claimed is:

1. A process for preparing a polyester product, said process comprising the reaction, at an elevated temperature, of a reaction mixture comprising a lower alkyl ester of a polybasic acid and a polyol reactant which contains at least a minor proportion of a glycoside reactant.

2. The process of claim 1 wherein the polyester product is an oil-free polyester resin.

3. The process of claim 1 wherein the polyester product is a relatively low to moderate molecular weight oligomeric material.

4. The process of claim 1 wherein the polyester product is an alkyd resin.

5. The process of claim 1 wherein at least a portion of the lower alkyl ester reactant is a lower alkyl ester of an aromatic polybasic acid.

6. The process of claim 1 wherein the glycoside reactant corresponds to the formula:

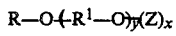   A wherein R is an alkyl, alkenyl or aryl group containing from 1 to about 30 carbon atoms; O represents an oxygen atom; $R^1$ is a $C_2$-$C_4$ divalent hydrocarbon radical; y is a number having an average value of from 0 to about 12; Z represents a moiety derived from a reducing saccharide containing 5 or 6 carbon atoms to which the moiety $R-O(R^1-O)_y$ is attached in the number 1 saccharide position; and x represents the degree of polymerization (D.P.) of said glycoside material and has an average value of from 1 to about 10.

7. The process of claim 1 wherein the glycoside reactant is methyl glucoside.

8. The process of claim 1 wherein the glycoside reactant constitutes from about 10 to about 100 percent of the total weight of the polyol reactant.

9. The process of claim 1 wherein the polyol reactant further comprises a glyceride mixture predominantly composed of mono- and diglycerides in which at least about 35 weight percent of said glyceride mixture is composed of monoglycerides.

10. The process of claim 1 wherein the lower alkanol which is generated by the reaction between the polyol reactant and the lower alkyl ester reactant is removed from the reaction mixture during the course of the reaction process.

11. The process of claim 1 wherein said reaction is conducted at a temperature of from about 170° to about 240° C.

12. The process of claim 1 wherein the reaction mixture further comprises an aliphatic polybasic acid or anhydride.

13. The process of claim 12 wherein at least a portion of the lower alkyl ester reactant is a lower alkyl ester of an aromatic polybasic acid.

14. The process of claim 1 wherein at least a portion of the lower alkyl ester reactant is a complete lower alkyl ester of a polybasic acid.

15. The process of claim 1 wherein at least a portion of the lower alkyl ester reactant is a complete lower alkyl ester of an aromatic polybasic acid.

16. A single step process for preparing an alkyd resin product wherein a polyol component containing at least a minor proportion of a glycoside reactant, a lower alkyl ester of a polybasic acid and a lower alkyl ester of a fatty acid are all charged to a reaction vessel and are simultaneously reacted at an elevated temperature while removing at least a substantial portion of the lower alcohol which is liberated during the course of the reaction process.

* * * * *